(12) United States Patent
Katanoda et al.

(10) Patent No.: US 11,235,674 B2
(45) Date of Patent: Feb. 1, 2022

(54) CONTROL APPARATUS FOR PROVIDING VEHICLE AND AUTOMOBILE NAVIGATION THAT INCORPORATES INFORMATION RELATED TO CHARGING STATIONS

(71) Applicant: TOYOTA JIDOSHA KABUSHIKI KAISHA, Toyota (JP)

(72) Inventors: Tomoya Katanoda, Toyota (JP); Hirotaka Omisha, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 16/290,024

(22) Filed: Mar. 1, 2019

(65) Prior Publication Data

US 2019/0275902 A1    Sep. 12, 2019

(30) Foreign Application Priority Data

Mar. 12, 2018  (JP) .............................. JP2018-043740

(51) Int. Cl.
| | |
|---|---|
| *H02J 7/00* | (2006.01) |
| *B60L 53/12* | (2019.01) |
| *B60L 53/66* | (2019.01) |
| *G01C 21/34* | (2006.01) |
| *B60L 3/08* | (2006.01) |
| *G01C 21/36* | (2006.01) |

(52) U.S. Cl.
CPC ................. *B60L 53/12* (2019.02); *B60L 3/08* (2013.01); *B60L 53/66* (2019.02); *G01C 21/34* (2013.01); *G01C 21/3469* (2013.01); *G01C 21/3617* (2013.01); *G01C 21/3682* (2013.01); *G01C 21/3697* (2013.01); *B60L 2240/622* (2013.01); *B60L 2240/72* (2013.01); *B60L 2250/16* (2013.01); *B60L 2260/50* (2013.01); *B60L 2260/52* (2013.01); *B60W 2556/50* (2020.02)

(58) Field of Classification Search
CPC ....................................................... B60L 53/12
USPC ......................................................... 320/104
See application file for complete search history.

(56) References Cited

U.S. PATENT DOCUMENTS

| | | | |
|---|---|---|---|
| 5,815,824 A | 9/1998 | Saga et al. | |
| 8,912,753 B2 * | 12/2014 | Pudar ..................... | B60L 53/63 320/109 |

(Continued)

FOREIGN PATENT DOCUMENTS

| | | |
|---|---|---|
| EP | 3104121 A1 | 12/2016 |
| JP | 8-240435 A | 9/1996 |

(Continued)

*Primary Examiner* — Yalkew Fantu
(74) *Attorney, Agent, or Firm* — Sughrue Mion, PLLC

(57) ABSTRACT

A control apparatus for a vehicle, is mounted on an automobile that has a motor for traveling and a power storage apparatus for exchanging electric power with the motor. The control apparatus is configured to execute external charging for charging the power storage apparatus by using electric power from an external power supply, and is configured to perform a route guidance for a planned travel route to a destination. When operation information on a charging spot of the destination is not obtainable and it is predicted that the charging spot of the destination is not usable, it is recommended to execute the external charging at a charging spot around the planned travel route.

12 Claims, 11 Drawing Sheets

(56) References Cited

U.S. PATENT DOCUMENTS

| | | | |
|---|---|---|---|
| 2011/0032110 A1 | 2/2011 | Taguchi | |
| 2012/0032637 A1* | 2/2012 | Kotooka | B60L 53/11 320/109 |
| 2014/0180517 A1* | 6/2014 | Endo | B60W 10/26 701/22 |
| 2015/0073636 A1* | 3/2015 | Machino | B60L 3/12 701/22 |
| 2015/0115886 A1* | 4/2015 | Loftus | B60L 53/00 320/109 |
| 2017/0010116 A1 | 1/2017 | Inoue et al. | |

FOREIGN PATENT DOCUMENTS

| | | |
|---|---|---|
| JP | 2003-294463 A | 10/2003 |
| JP | 2008-100645 A | 5/2008 |
| JP | 2011-38845 A | 2/2011 |
| JP | 2013-156050 A | 8/2013 |
| JP | 2014-20931 A | 2/2014 |
| JP | 2014-163742 A | 9/2014 |
| JP | 2011-232208 A | 11/2017 |
| WO | 2013/145214 A1 | 10/2013 |
| WO | 2015/118780 A1 | 8/2015 |

* cited by examiner

CONTROL APPARATUS FOR PROVIDING VEHICLE AND AUTOMOBILE NAVIGATION THAT INCORPORATES INFORMATION RELATED TO CHARGING STATIONS

INCORPORATION BY REFERENCE

The disclosure of Japanese Patent Application No. 2018-043740 filed on Mar. 12, 2018 including the specification, drawings and abstract is incorporated herein by reference in its entirety.

BACKGROUND

1. Technical Field

The disclosure relates to a control apparatus for a vehicle and an automobile.

2. Description of Related Art

In the related art, as this type of the control apparatus for a vehicle, there is proposed a control apparatus that is mounted on an electric automobile having a motor and a battery and performs a route guidance for a planned travel route to a destination (for example, see Japanese Patent Application Publication No. 2011-232208 (JP 2011-232208 A)). When it is determined that it is needed to charge a battery while the vehicle is on the way to the destination, this control apparatus for a vehicle performs a guidance on a charging station and the destination, by researching for the planned travel route to arrive at the destination through the charging station and performing a route guidance for the re-searched planned travel route.

SUMMARY

When it is determined that the vehicle can travel to the destination without charging the battery, the control apparatus for a vehicle described above does not perform a guidance on the charging station around the planned travel route. Therefore, when, although the vehicle has traveled to the destination without charging the battery, the battery cannot be charged at the destination, there is a possibility that in a new traveling thereafter, the vehicle has an electricity shortage.

The main object of the control apparatus for a vehicle and the automobile according to the disclosure is to prevent the vehicle from having an electricity shortage.

In order to achieve the main object as described above, the control apparatus for a vehicle and the automobile according to the disclosure have adopted the following features.

According to a first aspect of the disclosure, there is provided a control apparatus for a vehicle, which is mounted on an automobile that has a motor for traveling and a power storage apparatus for exchanging electric power with the motor. The control apparatus for a vehicle, includes an electronic control unit configured to execute external charging for charging the power storage apparatus by using electric power from an external power supply, and a navigation apparatus configured to perform a route guidance for a planned travel route to a destination. When operation information on a charging spot of the destination is not obtainable and it is predicted that the charging spot of the destination is not usable, the navigation apparatus recommends to execute the external charging at a charging spot around the planned travel route.

In the control apparatus for a vehicle, which performs the route guidance for a planned travel route to a destination, according to the first aspect, when operation information on the charging spot of the destination is not obtainable and it is predicted that the charging spot of the destination is not usable, the navigation apparatus recommends to execute the external charging at a charging spot around the planned travel route. In this way, it is possible to promote the execution of external charging at the charging spot around the planned travel route before arriving at the destination. As a result, when external charging is not executable at the destination, it is possible to prevent the vehicle from having an electricity shortage in a new traveling after arriving at the destination. Here, as a "charging spot around the planned travel route", a charging spot along the planned travel route, or a charging spot (a charging spot through which the vehicle can pass by taking a slight detour from the planned travel route) that is within a predetermined distance away from the planned travel route may be mentioned.

In such a control apparatus for a vehicle according to the first aspect, when it is predicted that the charging spot of the destination is not usable, as a recommendation for executing the external charging at a charging spot around the planned travel route, the navigation apparatus may report a fact that external charging at the charging spot of the destination is not executable, and a charging spot, which is capable of executing the external charging out of charging spots around the planned travel route. Through such processing, when it is predicted that the charging spot of the destination is not usable, it is possible to promote the execution of external charging at charging spots around the planned travel route before arriving at the destination.

Also, in the control apparatus for a vehicle according to the first aspect, when operation information on the charging spot of the destination is not obtainable, as a recommendation for executing the external charging at a charging spot around the planned travel route, the navigation apparatus may report a charging spot around the planned travel route. Through such processing, when operation information on the charging spot of the destination is not obtainable, it is possible to promote the execution of external charging at the charging spot around the planned travel route before arriving at the destination.

In such cases, when a fact that it is unnecessary to report the charging spot around the planned travel route is instructed by a user, the electronic control unit may limit an output of the power storage apparatus. In this way, it is possible to prevent a travelable distance thereafter from being shortened.

In the control apparatus for a vehicle according to the first aspect, the navigation apparatus may predict whether or not the charging spot of the destination is usable at a planned arrival time of the destination. In this way, it is possible to predict whether or not the charging spot of the destination is usable, with high accuracy.

In the control apparatus for a vehicle according to the first aspect, when the vehicle has arrived at the charging spot around the planned travel route, the navigation apparatus may report a charging amount needed for reaching a nearest charging spot in a new traveling after the vehicle has arrived at the destination. In this way, it is possible for a user to recognize this charging amount.

An automobile according to a second aspect of the disclosure includes: the control apparatus for a vehicle in any of aspects described above, a motor for traveling and a power storage apparatus for exchanging electric power with the motor. The control apparatus for a vehicle is mounted on the automobile, and includes an electronic control unit configured to execute external charging for charging the power storage apparatus by using electric power from an external power supply, and a navigation apparatus configured to perform a route guidance for a planned travel route to a destination. When operation information on the charging spot of the destination is not obtainable and it is predicted that the charging spot of the destination is not usable, the navigation apparatus recommends to execute the external charging at a charging spot around the planned travel route; the motor; and the power storage apparatus.

Since the automobile according to the second aspect includes: the control apparatus for a vehicle in any of aspects described above, it is possible to achieve an effect of the control apparatus for a vehicle according to the disclosure, for example, the same effect as an effect in which, when external charging is not executable at the destination, it is possible to prevent the vehicle from having an electricity shortage in a new traveling after arriving at the destination.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, forms for implementing the disclosure will be described with reference to embodiments.

Figure 1:
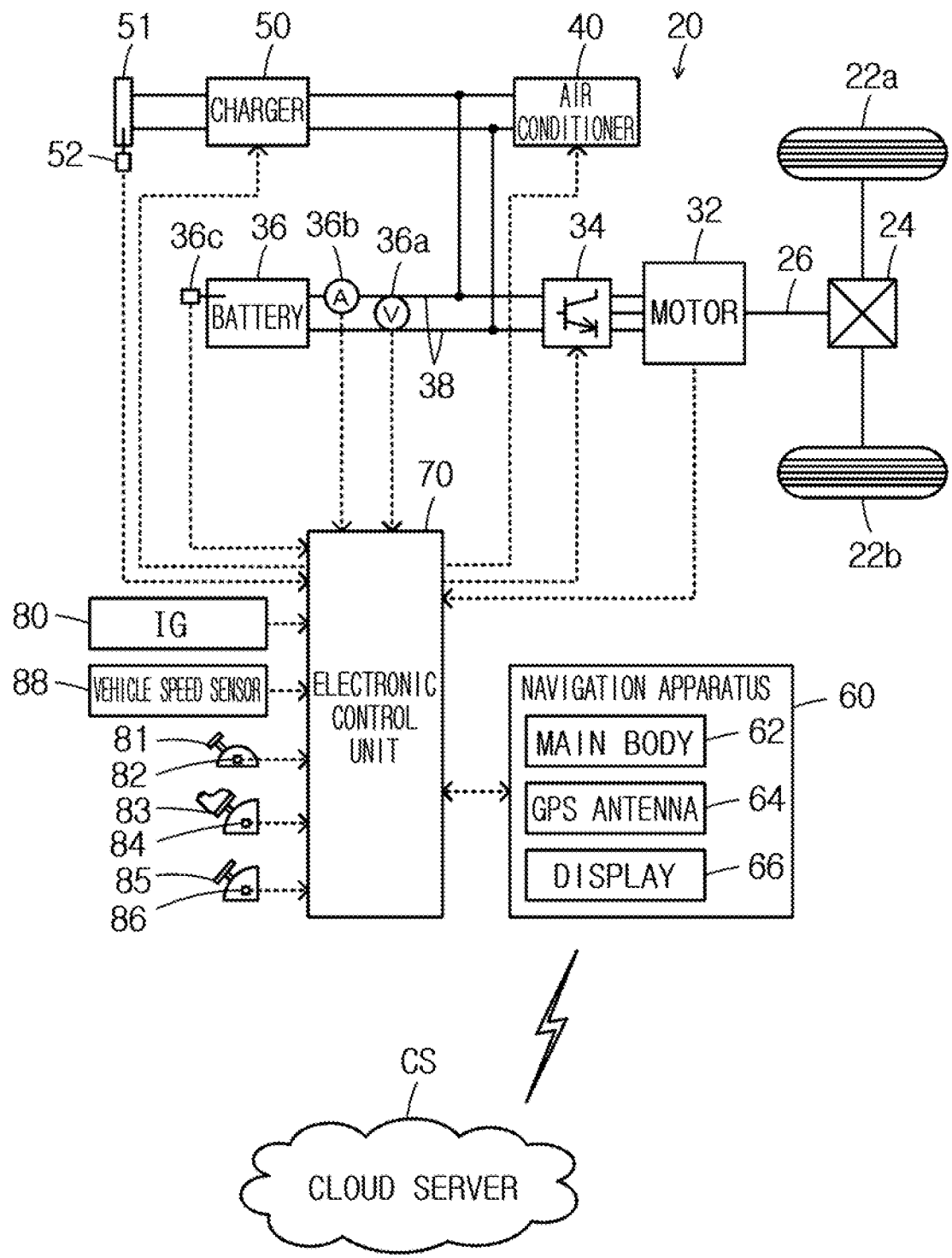
FIG. 1 is a structure diagram schematically illustrating a configuration of an electric automobile on which a control apparatus for a vehicle according to one embodiment of the disclosure is mounted.

FIG. 1 is a structure diagram schematically illustrating a configuration of an electric automobile 20 on which a control apparatus for a vehicle according to one embodiment of the disclosure is mounted. As illustrated in the drawing, the electric automobile 20 in the embodiment has a motor 32, an inverter 34, a battery 36 as a power storage apparatus, an air conditioner 40, a charger 50, a navigation apparatus 60, and an electronic control unit 70. The "control apparatus for a vehicle" in the embodiment corresponds to the navigation apparatus 60 and the electronic control unit 70.

The motor 32 is configured as a synchronous generator motor, for example, in which a rotor is connected to a drive shaft 26 connected to drive wheels 22a and 22b through a differential gear 24. The inverter 34 is used for driving the motor 32 and is connected to the battery 36 through a power line 38. Since a plurality of switching elements (not illustrated) of the inverter 34 is subjected to switching control by the electronic control unit 70, the motor 32 is rotationally driven.

The battery 36 is, for example, a lithium-ion secondary battery or a nickel-hydrogen secondary battery. The air conditioner 40 is connected to the power line 38 and uses the electric power from the battery 36 to perform air conditioning in the passenger compartment. The air conditioner 40 is controlled by the electronic control unit.

The charger 50, which is connected to the power line 38, is configured to be capable of executing external charging for charging the battery 36 by using electric power from the charging spot (electric power from an external power supply), when a spot side connector of the charging spot and a vehicle side connector 51 are connected to each other. The charger 50 is controlled by the electronic control unit 70.

The navigation apparatus 60 includes a main body 62 having a storage medium such as a hard disk, in which map information and the like are stored, a CPU, a ROM, a RAM, an input/output port, and a communication port; a GPS antenna 64 that receives information on the current location of the vehicle; and a touch panel type display 66 that displays various information such as map information, a current location of the vehicle, and a planned travel route to a destination and allows a user to input various instructions. Here, the map information includes service information (for example, information on facilities, parking lots, and charging spots, and the like), road information for each of predetermined travel sections (for example, a section between traffic lights or a section between intersections), and the like. The road information includes distance information, width information, lane number information, regional information (urban or suburban), type information (general roads, highways, and toll roads), slope information, a legal speed, the number of traffic signals, and the like. The navigation apparatus 60 is connected to the electronic control unit 70 through a communication port.

In the navigation apparatus 60, once the user operates the display 66 to set a destination, the main body 62 searches for a planned travel route from a current location to the destination based on map information and the current location and the destination of the vehicle, and displays the searched planned travel route on the display 66 to perform a route guidance. Also, at this time, the main body 62 calculates a planned arrival time of the destination based on the map information and the current location and the destination of the vehicle, and displays the calculated planned arrival time on the display 66.

Also, the navigation apparatus 60 is configured to be able to communicate with a cloud server CS by wireless. The cloud server CS is configured to be able to communicate with each vehicle including the electric automobile 20 by wireless, and stores map information, travel history information of each vehicle, and the like. In addition to the map information similar to the map information stored in the main body 62 of the navigation apparatus 60, the map information stored in the cloud server CS includes information on the business hours of each charging spot, information on whether or not each charging spot has a failure, and the like. The travel history information includes a past travel route, a traveling date, a parking place, parking date and time, and the like of each vehicle.

The electronic control unit 70 is configured as a microprocessor centering on a CPU (not illustrated), and includes a ROM for storing a processing program, a RAM for temporarily storing data, an input/output port, and a communication port, in addition to the CPU. Signals from various sensors are input to the electronic control unit 70 through the input port. As the signals input to the electronic control unit 70, for example, a rotational position θm of the rotor of the motor 32 from a rotational position sensor (not illustrated) that detects a rotational position of the rotor of the motor 32, or phase currents Iu, Iv and Iw of each phase of the motor 32 from a current sensor (not illustrated) that detects the phase current of each phase of the motor 32 may be mentioned. Also, a voltage Vb of the battery 36 from a voltage sensor 36a, which is provided between the terminals of the battery 36, a current Ib of the battery 36 from a current sensor 36b, which is provided on an output terminal of the battery 36, or a temperature Tb of the battery 36 from a temperature sensor 36c, which is provided to the battery 36, may be mentioned. A connection detection signal from a connection detection sensor 52 that detects a connection between the vehicle side connector 51 and a spot side connector of the charging spot, may be mentioned. An ignition signal from an ignition switch 80 or a shifting position SP from a shift position sensor 82 that detects an operation position of a shift lever 81, may be mentioned. An accelerator opening Acc from an accelerator pedal position sensor 84 that detects a depression amount of an accelerator pedal 83, a brake pedal position BP from a brake pedal position sensor 86 that detects a depression amount of a brake pedal 85, or a vehicle speed V from a vehicle speed sensor 88, may be mentioned.

Various control signals from the electronic control unit 70 are output through output ports. As signals output from the electronic control unit 70, for example, a control signal to the inverter 34 or a control signal to the charger 50 may be mentioned. The electronic control unit 70 calculates a power accumulation ratio SOC of the battery 36 based on an integrated value of an input/output current Ib of the battery 36 from the current sensor 36b. Here, the power accumulation ratio SOC is a ratio of an electric power amount dischargeable from the battery 36, to the total capacity of the battery 36. The electronic control unit 70 is connected to the navigation apparatus 60 through the communication port as described above. Incidentally, instead of or in addition to the navigation apparatus 60, the electronic control unit 70 may be configured to be able to communicate with the cloud server CS by wireless.

In the electric automobile 20 of the embodiment configured as described above, the electronic control unit 70 sets a required torque Td* (required for the drive shaft 26) required for traveling based on the accelerator opening Acc and the vehicle speed V, sets a required torque Td* in a torque command Tm* of the motor 32 such that the required torque Td* is output to the drive shaft 26, and performs switching control of the plurality of switching elements of the inverter 34 such that the motor 32 is driven by the torque command Tm*.

Also, in the electric automobile 20 of the embodiment, once the spot side connector of the charging spot and the vehicle side connector 51 are connected to each other (once the connection detection sensor 52 detects a connection between the spot side connector of the charging spot and the vehicle side connector) during parking, the electronic control unit 70 executes external charging by controlling the charger 50 such that the battery 36 is charged using the electric power from the charging spot (electric power from an external power supply).

Figure 2:
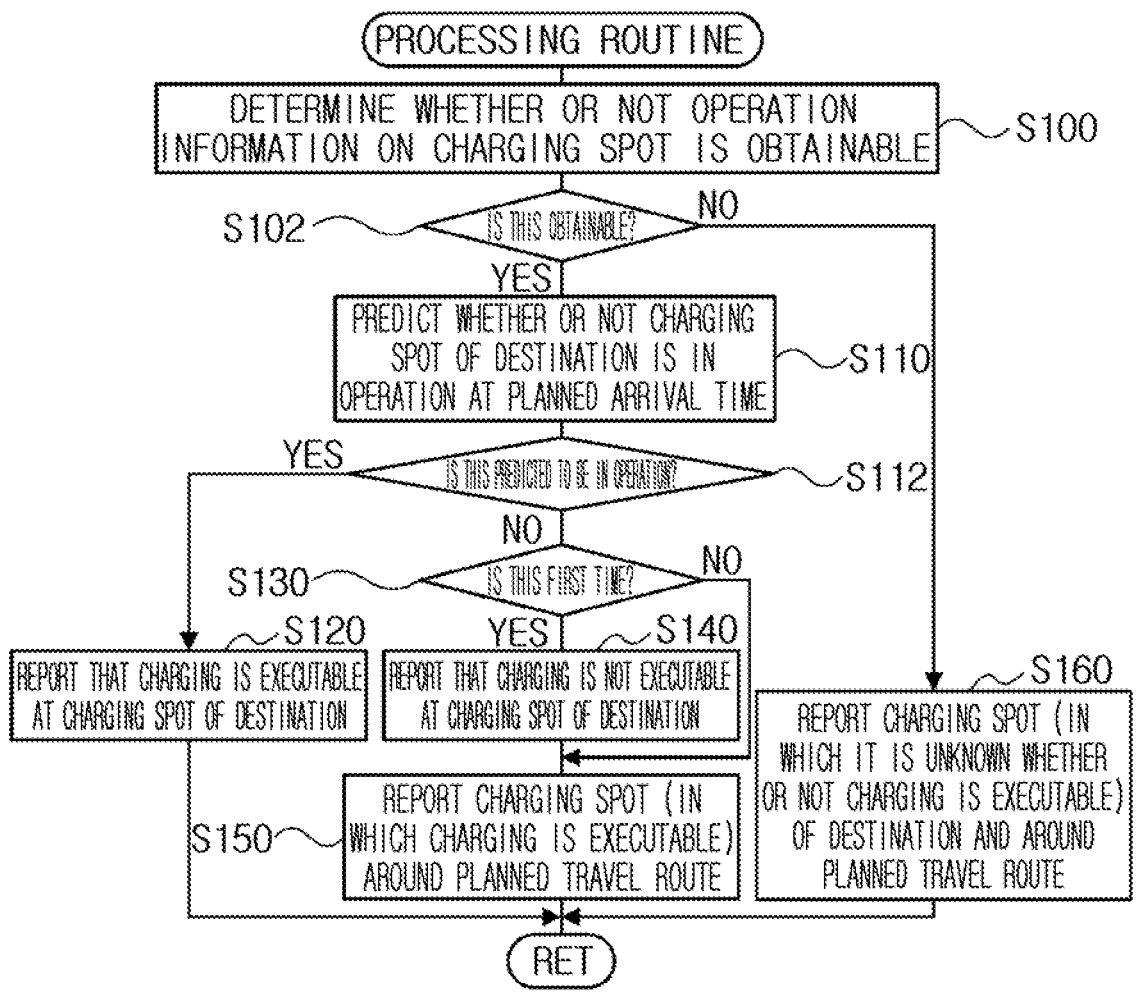
FIG. 2 is a flowchart illustrating an example of a processing routine executed by a main body of a navigation apparatus.

Next, the operations of the control apparatus for a vehicle mounted on the electric automobile 20 in the embodiment which is configured in this way, in particular, the operations of the navigation apparatus 60 will be described. FIG. 2 is a flowchart illustrating an example of a processing routine executed by the main body 62 of the navigation apparatus 60. This routine is repeatedly executed while the route guidance of the planned travel route to the destination is being performed.

Once the processing routine in FIG. 2 is executed, at first, the main body 62 of the navigation apparatus 60 determines whether or not the operation information on a charging spot is obtainable from the cloud server CS (steps S100 and S102). Here, the operation information on the charging spot is, for example, information on the business hours of the charging spot, or information on whether or not the charging spot has a failure, and the like. The determination processing in step S100 is performed, for example, by determining whether or not communication with the cloud server CS can be performed. Incidentally, as a case where communication with the cloud server CS cannot be performed, for example, there may be mentioned a case where the cloud server CS is stopped due to a power failure or the like.

When it is determined in steps S100 and S102 that the operation information on the charging spots is obtainable from the cloud server CS, it is predicted whether or not the charging spot of the destination is in operation at the planned arrival time of the destination (steps S110 and S112). Here, the planned arrival time of the destination is calculated based on the map information and the current location and the destination of the vehicle, as described above.

The determination processing in steps S110 and S112 is performed, for example, as follows. It is determined whether or not the charging spot of the destination has a failure, and it is determined whether or not the planned arrival time of the destination is within the business hours of the charging spot of the destination. Then, when the charging spot of the destination does not have a failure (available) and the planned arrival time of the destination is within the business hours of the charging spot of the destination, it is predicted that the charging spot of the destination is in operation at the planned arrival time of the destination. On the other hand, when the charging spot of the destination has a failure (including a period during an inspection or repair) or when the planned arrival time of the destination is out of the business hours of the charging spot of the destination, it is predicted that the charging spot of the destination is not in operation at the planned arrival time of the destination.

When it is predicted in steps S110 and S112 that the charging spot of the destination is in operation at the planned arrival time of the destination, the fact that the external charging is executable at the charging spot of the destination is reported (step S120), and the routine is ended.

Figure 3:
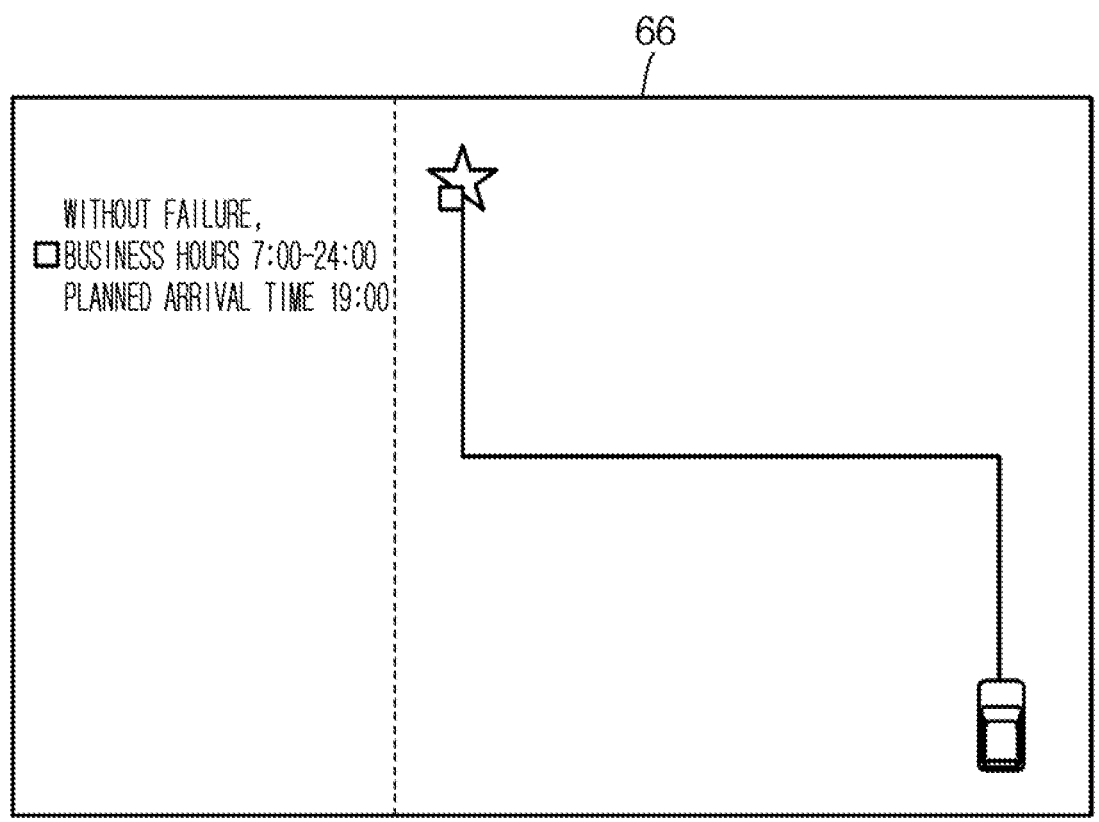
FIG. 3 is an explanatory diagram illustrating an example of the display contents of a display.

FIG. 3 is an explanatory diagram illustrating an example of the display contents of the display 66 in this case. In FIG. 3 and each of the following drawings for illustrating an example of the display contents of the display 66, a star indicates a destination, a white square indicates a charging spot that is predicted to be capable of executing external charging, a black square indicates a charging spot that is predicted not to be capable of executing external charging, and a triangle indicates a charging spot in which it is unknown whether external charging is executable. The charging spot having a white square or black square displays with/without a failure, business hours, and the planned arrival time of the vehicle. In the case of FIG. 3, by displaying a white square (a charging spot that is predicted to be capable of executing external charging) at the same point as a star (destination) in the display 66, the fact that the external charging is executable at the charging spot of the destination is reported.

When it is predicted in steps S110 and S112 that the charging spot of the destination is not in operation at the planned arrival time of the destination, it is determined whether or not this prediction is the first time (step S130). Then, when it is determined that this prediction is the first time, the fact that the external charging is not executable at the charging spot of the destination is reported (step S140), and thereafter, a charging spot, which is capable of executing external charging at the planned arrival time out of the charging spots around the planned travel route, is reported (step S150), and the routine is ended. Here, as a "charging spot around the planned travel route", a charging spot along the planned travel route, or a charging spot (a charging spot through which the vehicle can pass by taking a slight detour from the planned travel route) that is within a predetermined distance away from the planned travel route may be mentioned. The planned arrival time of the charging spot around the planned travel route is calculated, similarly to the planned arrival time of the destination.

Figure 4:
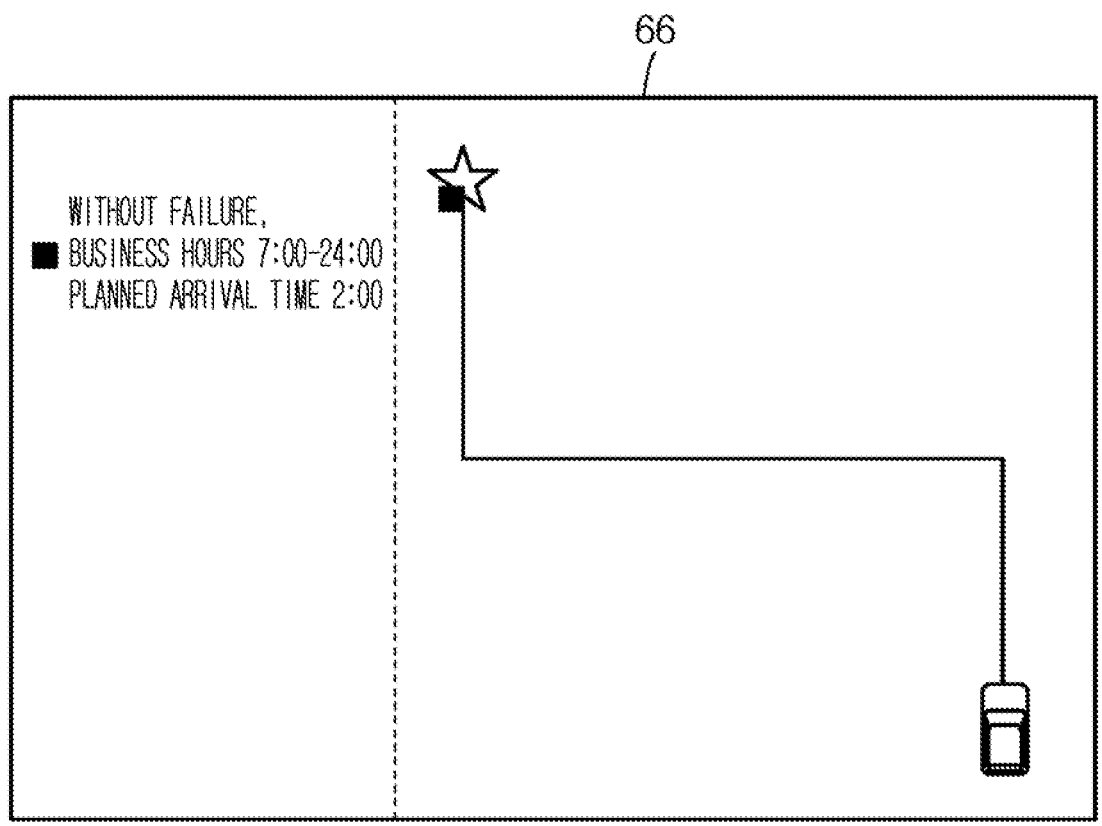
FIG. 4 is an explanatory diagram illustrating an example of the display contents of the display.
Figure 5:
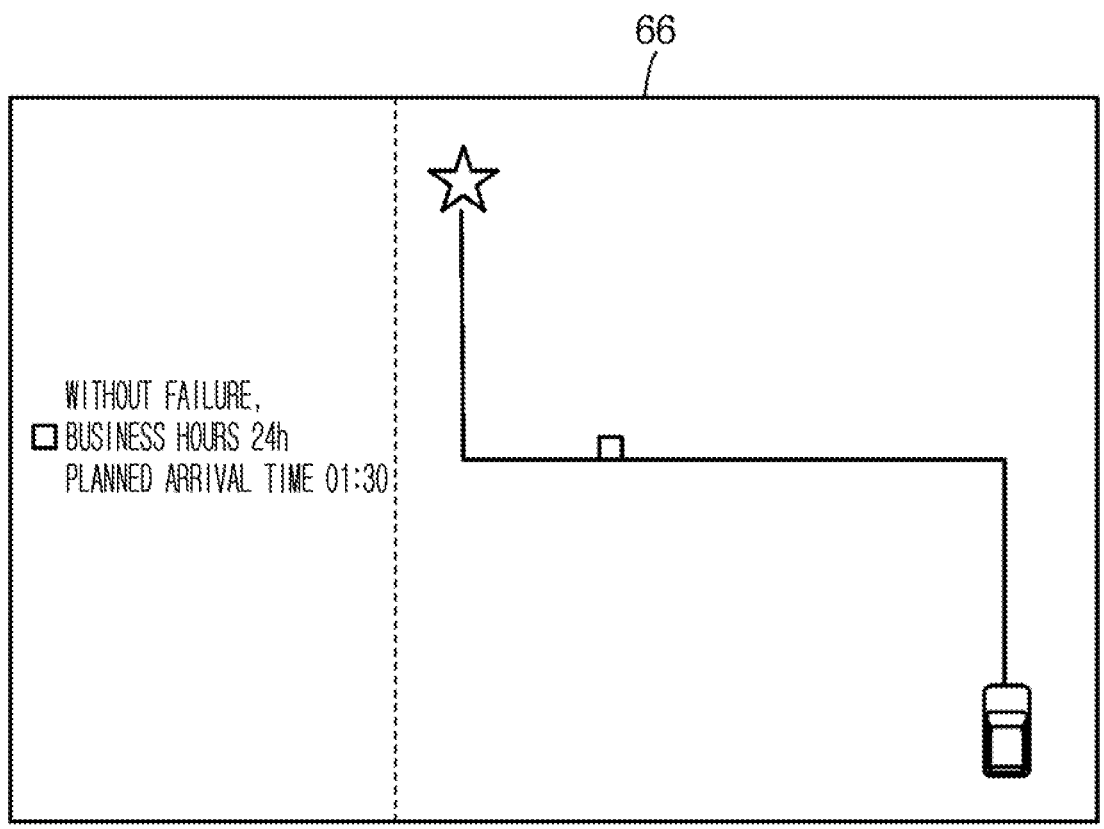
FIG. 5 is an explanatory diagram illustrating an example of the display contents of the display.

FIG. 4 is an explanatory diagram illustrating an example of the display contents of the display 66 in the processing of step S140, and FIG. 5 is an explanatory diagram illustrating an example of the display contents of the display 66 in the processing of step S150. In the case of FIG. 4, by displaying a black square (a charging spot that is predicted not to be capable of executing external charging) at the same point as the star (destination) in the display 66, the fact that the external charging is executable at the charging spot of the destination is reported. In the case of FIG. 5, by displaying a white square (a charging spot that is predicted to be capable of executing external charging) around the planned travel route in the display 66, a charging spot, which is capable of executing external charging at the planned arrival time out of the charging spots around the planned travel route, is reported. In this way, it is possible to recommend the execution of external charging at a charging spot around the planned travel route (a charging spot before reaching the destination). Incidentally, switching of the display contents of the display 66 may be performed when a predetermined period of time has elapsed from a start of the display of the display contents of FIG. 4, or may be performed when the switching is instructed by a user while the display contents of FIG. 4 are being displayed.

When it is determined in step S130 that this prediction in which the charging spot of the destination is not in operation at the planned arrival time of the destination is not the first time, the processing of step S150 is executed without executing the processing of step S140, and the routine is ended.

When it is determined in steps S100 and S102 that the operation information on the charging spots is not obtainable from the cloud server CS, the charging spot of the destination and the charging spots around the planned travel route are reported (step S160) and the routine is ended.

Figure 6:
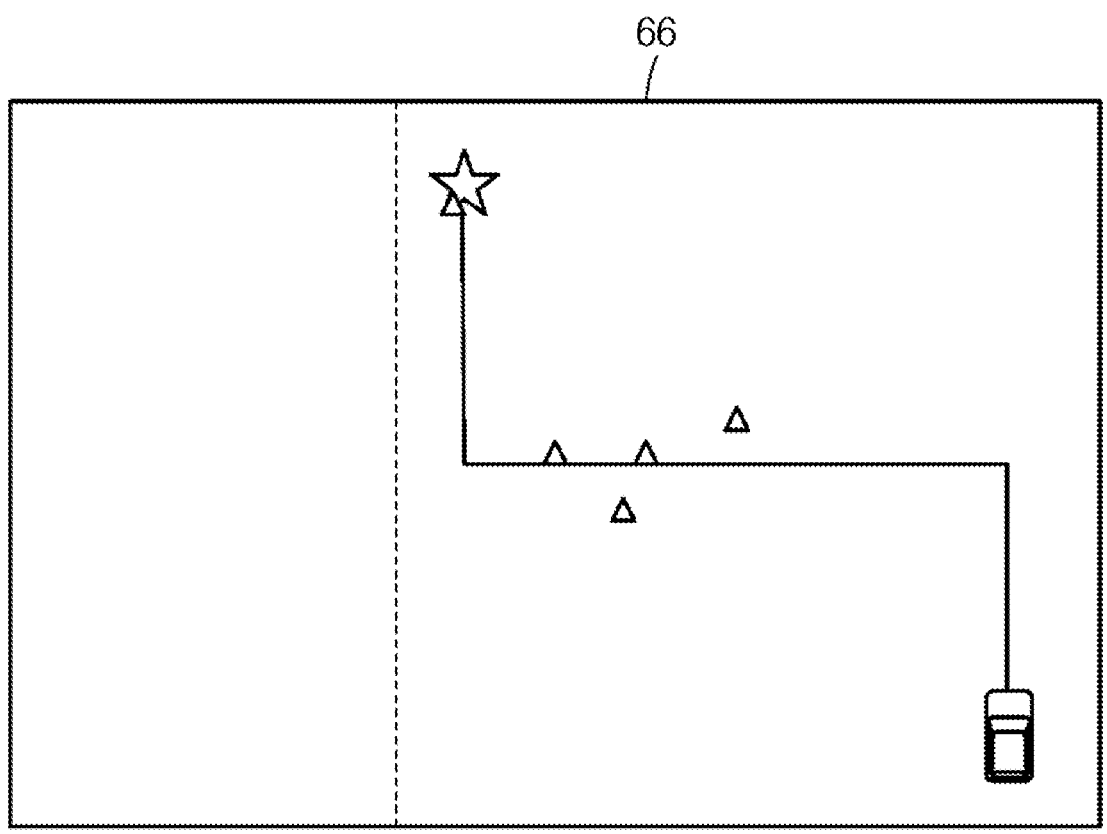
FIG. 6 is an explanatory diagram illustrating an example of the display contents of the display.

FIG. 6 is an explanatory diagram illustrating an example of the display contents of the display 66 in this case. In the case of FIG. 6, by displaying a triangle (a charging spot in which it is unknown whether external charging is executable) at the same point as the star (destination) or around the planned travel route in the display 66, the charging spot of the destination and the charging spots around the planned travel route are reported. In this way, it is possible to recommend the execution of external charging at a charging spot around the planned travel route (a charging spot before reaching the destination).

In the control apparatus for a vehicle mounted on the electric automobile 20 of the embodiment described above, in particular, the navigation apparatus 60, when it is predicted that the charging spot of the destination is not in operation at the planned arrival time of the destination, the fact that the external charging is not executable at the charging spot of the destination, and a charging spot, which is capable of executing external charging at the planned arrival time out of the charging spots around the planned travel route, are reported. Also, when the operation information on the charging spots is not obtainable from the cloud server CS, the charging spot of the destination and the charging spots around the planned travel route are reported. In this way, it is possible to recommend the execution of external charging at a charging spot around the planned travel route (a charging spot before arriving at the destination). As a result, when external charging is not executable at the destination, it is possible to prevent the vehicle from having an electricity shortage in a new traveling after arriving at the destination.

Figure 7:
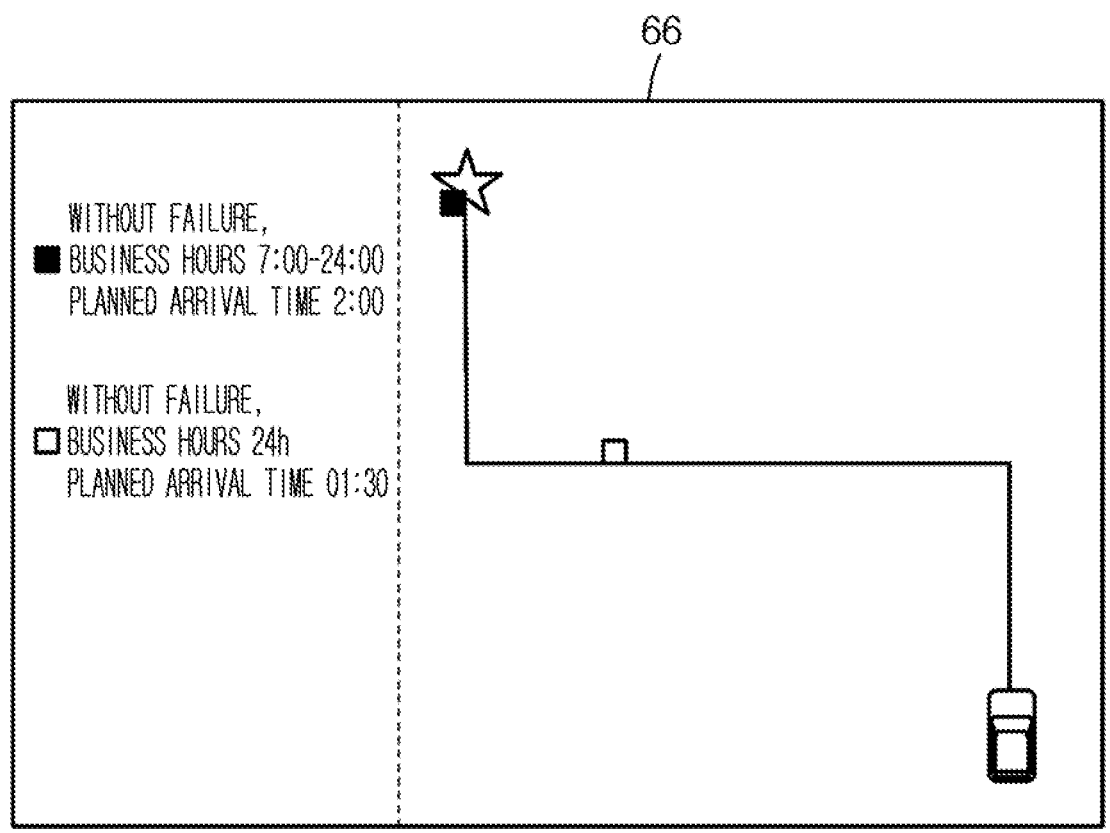
FIG. 7 is an explanatory diagram illustrating an example of the display contents of the display.

In the control apparatus for a vehicle mounted on the electric automobile 20 of the embodiment, in particular, the navigation apparatus 60, when it is predicted that the charging spot of the destination is not in operation at the planned arrival time of the destination and when this prediction is the first time, after it is reported that the external charging is not executable at the charging spot of the destination, a charging spot, which is capable of executing the external charging out of the charging spots around the planned travel route, is reported (see FIG. 4 and FIG. 5). When this prediction is not the first time, a charging spot, which is capable of executing external charging at the planned arrival time out of the charging spots around the planned travel route, is reported (see FIG. 5). However, the fact that the external charging is not executable at the charging spot of the destination, and a charging spot, which is capable of executing external charging at the planned arrival time out of the charging spots around the planned travel route, may be reported at the same time. FIG. 7 is an explanatory diagram illustrating an example of the display contents of the display 66 in this case. In the case of FIG. 7, by displaying a black square (a charging spot that is predicted not to be capable of executing external charging) at the same point as the star (destination) in the display 66, and displaying a white square (a charging spot that is predicted to be capable of executing external charging) around the planned travel route in the display 66, the fact that the external charging is not executable at the charging spot of the destination, and a charging spot, which is capable of executing external charging at the planned arrival time out of the charging spots around the planned travel route, are reported at the same time. In this way, it is possible to recommend the execution of external charging at a charging spot around the planned travel route (a charging spot before reaching the destination).

Figure 8:
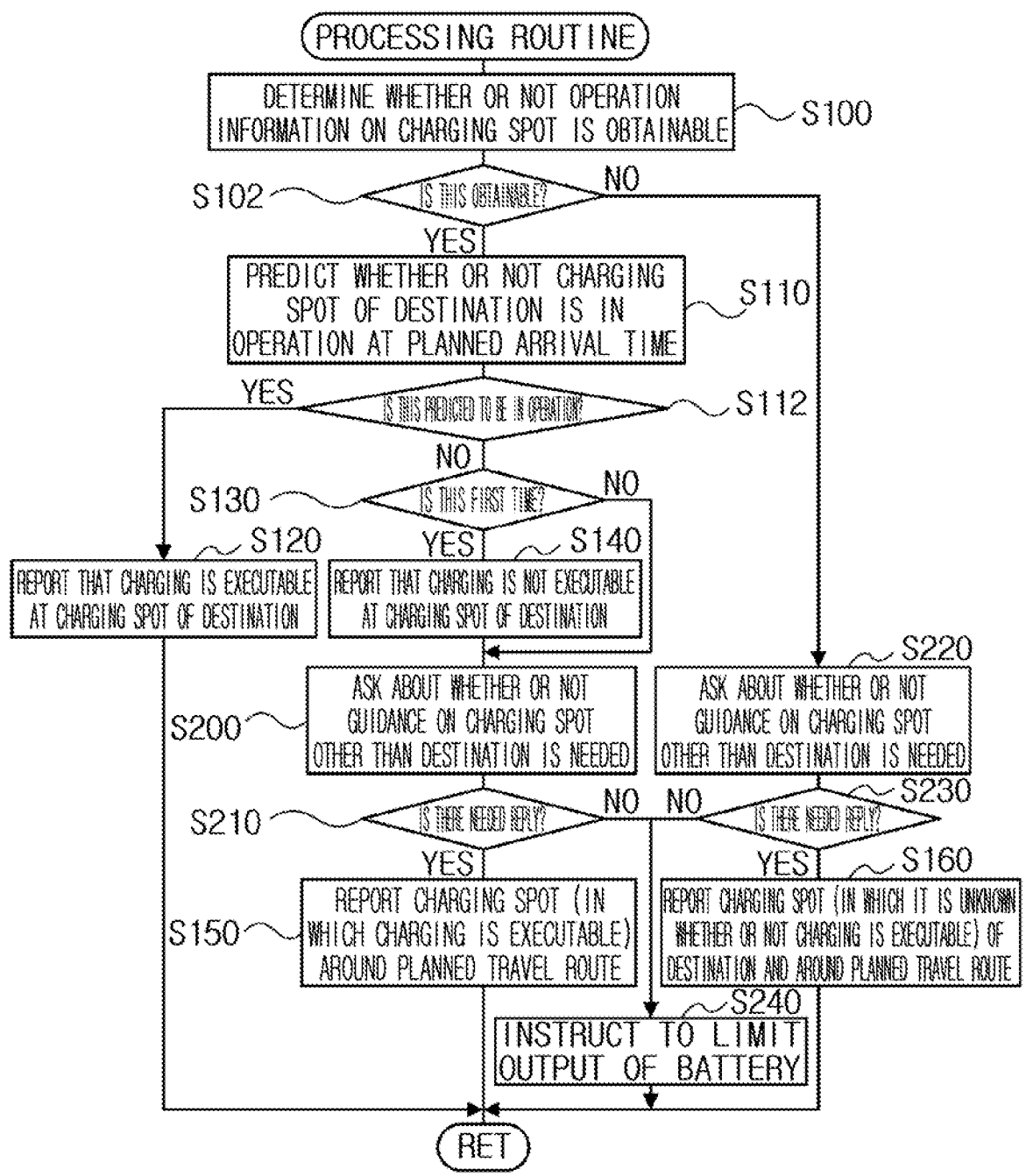
FIG. 8 is a flowchart illustrating an example of the processing routine of a modification example.

In the control apparatus for a vehicle mounted on the electric automobile 20 of the embodiment, in particular, the navigation apparatus 60, the main body 62 executes the processing routine in FIG. 2. However, instead of this main body, the processing routine in FIG. 8 may be executed. Here, the processing routine in FIG. 8 is the same as the processing routine in FIG. 2, except that the processing of steps S200 to S240 is added. Therefore, the same processing is denoted by the same step numeral, and a detailed description thereof will not be repeated.

In the processing routine of FIG. 8, the main body 62 of the navigation apparatus 60 asks a user about whether or not a guidance on a charging spot other than the destination is needed, after the execution of the processing of steps S130 and S140 and before the execution of the processing of step S150 (step S200), and it is determined whether or not a reply, in which the guidance on a charging spot other than the destination is needed, is obtained (step S210).

Figure 9:
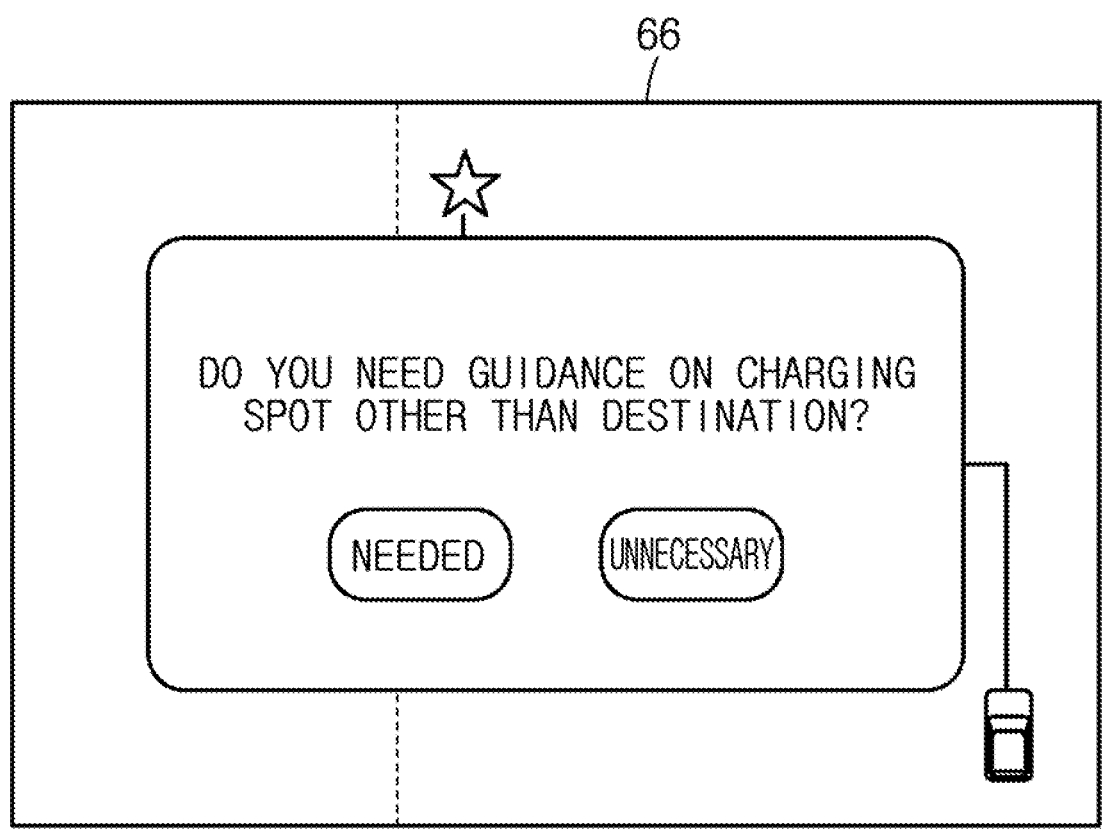
FIG. 9 is an explanatory diagram illustrating an example of the display contents of the display.

FIG. 9 is an explanatory diagram illustrating an example of the display contents of the display 66 in the processing of steps S200 and S210. In the case of FIG. 9, the display 66 asks the user by displaying a message of "DO YOU NEED A GUIDANCE ON A CHARGING SPOT OTHER THAN THE DESTINATION?", and a selection button of "NEEDED" and "UNNECESSARY". Then, when the "NEEDED" is touched within a predetermined period of time, it is determined that a reply, in which a guidance on a charging spot other than the destination is needed, is obtained. On the other hand, when the "UNNECESSARY" is touched within a predetermined period of time, or when neither "NEEDED" nor "UNNECESSARY" has been touched within a predetermined period of time, it is determined that a reply, in which a guidance on a charging spot other than the destination is needed, has not been obtained.

When it is determined in step S210 that a reply, in which a guidance on a charging spot other than the destination is needed, is obtained, the processing of step S150 is executed and the routine is ended. On the other hand, when it is determined that a reply, in which a guidance on a charging spot other than the destination is needed, is not obtained, an instruction to limit the output of the battery 36 is issued to the electronic control unit 70 without executing the processing of step S150 (step S240), and the routine is ended. Upon receiving an instruction to limit the output of the battery 36 from the navigation apparatus 60, the electronic control unit 70 limits the output of the battery 36 by limiting the power consumption of an auxiliary apparatus such as the air conditioner 40 and limiting the output of the motor 32. Through this processing, it is possible to prevent the power accumulation ratio SOC of the battery 36 from decreasing, and prevent a travelable distance thereafter from being shortened.

When it is determined in steps S100 and S102 that the operation information on the charging spots is not obtainable from the cloud server CS, similarly to the processing of steps S200 and S210, the user is asked about whether or not a guidance on a charging spot other than the destination is needed (step S220), and it is determined whether or not a reply, in which a guidance on a charging spot other than the destination is needed, is obtained (step S230). Then, when it is determined that a reply, in which a guidance on a charging spot other than the destination is needed, is obtained, the processing of step S160 is executed and the routine is ended. On the other hand, when it is determined that a reply, in which a guidance on a charging spot other than the destination is needed, is not obtained, it is determined that an instruction to limit the output of the battery 36 is issued to the electronic control unit 70 without executing the processing of step S160 (step S240), and the routine is ended.

In the embodiment, as the operations of the control apparatus for a vehicle mounted on the electric automobile 20, the operations of the navigation apparatus 60 have been specifically described. By the execution of the processing routine in FIG. 2, the navigation apparatus 60 recommends to execute the external charging at a charging spot (a charging spot before reaching the destination) around the planned travel route, when it is predicted that the charging spot of the destination is not in operation at the planned arrival time of the destination, or when the operation information on the charging spot is not obtainable from the cloud server CS. Once the vehicle is parked at a charging spot around the planned travel route and a spot side connector of the charging spot and the vehicle side connector 51 are connected to each other, the electronic control unit 70 may execute the processing routine in FIG. 10.

Figure 10:
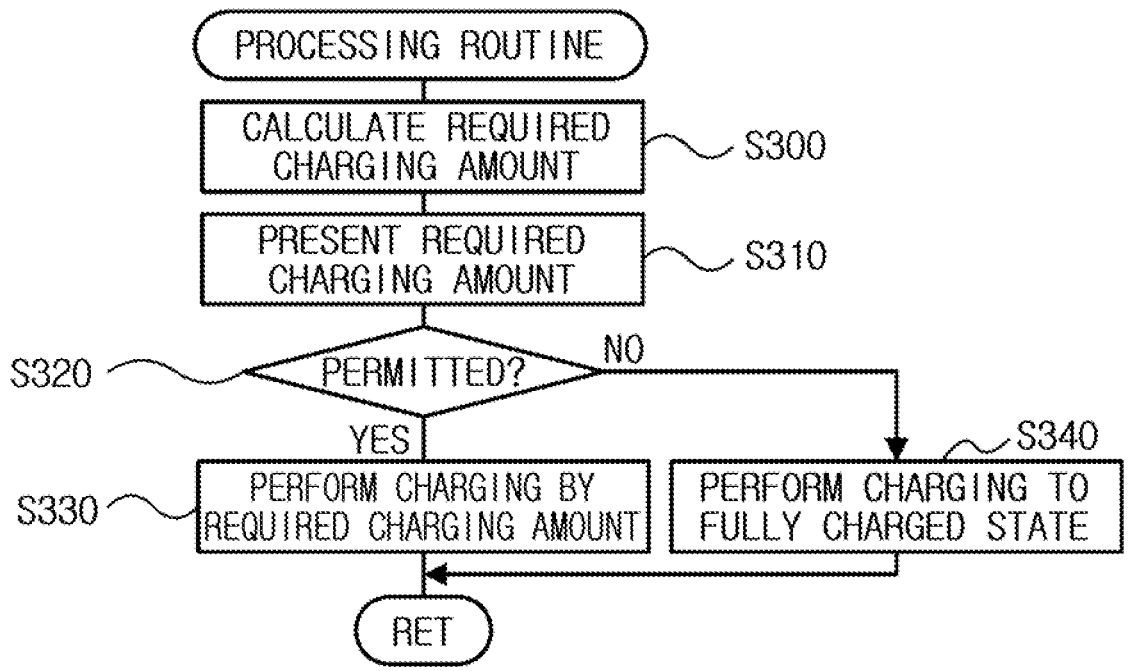
FIG. 10 is a flowchart illustrating an example of a processing routine executed by an electronic control unit.

Once the processing routine in FIG. 10 is executed, the electronic control unit 70 calculates a required charging amount Qchtag of the battery 36 (step S300), presents the calculated required charging amount Qchtag of the battery 36 (step S310), and determines whether or not the user has given a permission (step S320).

Here, the required charging amount of the battery 36 is calculated based on, for example, a current power accumulation ratio SOC of the battery 36, the map information from the navigation apparatus 60 or the current location and the destination of the vehicle, as an electric power amount corresponding to a difference between the current power accumulation ratio SOC and a value obtained by adding a margin to a power accumulation ratio SOC needed for reaching the nearest charging spot in a new traveling after the vehicle has arrived at the destination.

Figure 11:
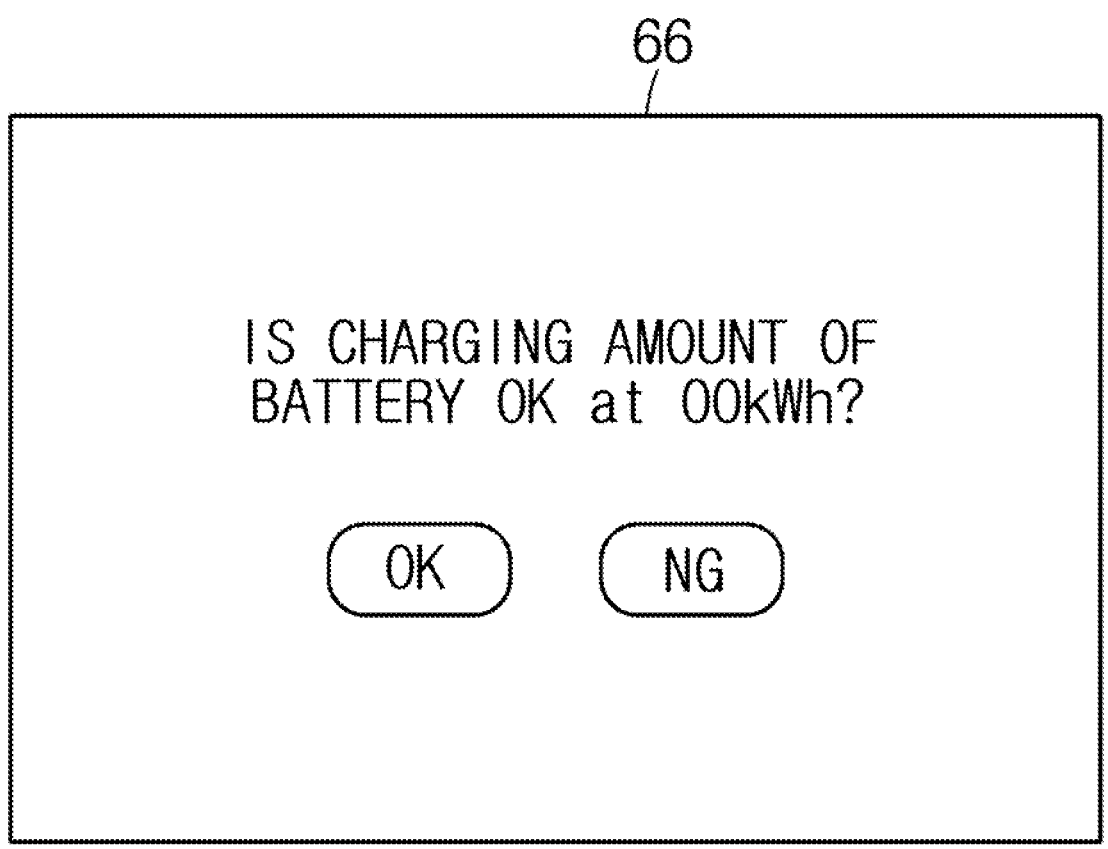
FIG. 11 is an explanatory diagram illustrating an example of the display contents of the display.

FIG. 11 is an explanatory diagram illustrating an example of the display contents of the display 66 in the processing of steps S310 and S320. In the case of FIG. 11, the display 66 indicates a message of "IS THE CHARGING AMOUNT OF THE BATTERY OK at ○○ kWh", and askes the user about whether or not to give a permission on the required charging amount Qchtag of the battery 36 by displaying a selection button of "OK" and "NG". Then, when "OK" is touched within a predetermined period of time, it is determined that the required charging amount Qchtag of the battery 36 is permitted. On the other hand, when "NG" is touched within a predetermined period of time, or when neither "OK" nor "NG" has touched within a predetermined period of time, it is determined that the required charging amount Qchtag of the battery 36 has not been permitted.

When it is determined in step S320 that the required charging amount Qchtag of the battery 36 is permitted, the battery 36 is charged by the required charging amount Qchtag by executing the external charging (step S330), and the routine is ended. On the other hand, when it is determined that the required charging amount Qchtag of the battery 36 has not been permitted, the battery 36 is charged to a fully charged state by executing the external charging (step S340), and the routine is ended. By presenting the required charging amount Qchtag of the battery 36, the user can select whether to charge the battery 36 with the required charging amount Qchtag or to a fully charged state. Since the external charging time in the former case is short as compared with the latter case, it is possible to start traveling to the destination sooner. On the other hand, since the power accumulation ratio SOC of the battery 36 in the latter case can be increased as compared with the former case, it is possible to increase the travelable distance thereafter.

In the electric automobile 20 of the embodiment, it is possible to obtain the operation information on the charging spot (for example, information on the business hours of the charging spot, information on whether or not the charging spot has a failure, and the like) from the cloud server CS by communicating with the cloud server CS. However, it is also possible to obtain operation information from each charging spot by communicating with each charging spot.

When the spot side connector of the charging spot and the vehicle side connector 51 are connected to each other during parking, the electric automobile 20 of the embodiment has the charger 50 for charging the battery 36 by using electric power from the charging spot (electric power from an external electric power supply), and may have a charger that charges the battery 36 by receiving electric power from the charging spot (electric power from an external electric power supply) in a non-contact manner, instead of or in addition to the charger 50.

In the electric automobile 20 of the embodiment, the battery 36 is used as a power storage apparatus, but instead of the battery 36, a capacitor may be used.

Correspondence between the main elements in the embodiment and the main elements of the disclosure described in the summary section will be described. In the embodiment, the motor 32 corresponds to the "motor", the battery 36 corresponds to the "power storage apparatus", the electric automobile 20 corresponds to the "automobile", and the navigation apparatus 60 and the electronic control unit 70 correspond to the "control apparatus for a vehicle".

Incidentally, the correspondence between the main elements in the embodiment and the main elements of the disclosure described in the summary section of the summary is not limited to elements of the disclosure described in the summary section, because the embodiment is one example for specifically describing a form for implementing the disclosure described in the summary section. That is, the analysis of the disclosure described in the summary section should be based on the description in the section, and the embodiment is merely a specific example of the disclosure described in the summary section.

Although the forms for implementing the disclosure have been described above with reference to the embodiments, the disclosure is not limited in any way to these examples, and the disclosure is not limited to these examples, and various forms of the disclosure is usable without departing from the spirit of the disclosure.

The disclosure is applicable to the manufacturing industry of a control apparatus for a vehicle, the automobile, and the like.

What is claimed is:

1. A control apparatus for a vehicle, which is mounted on an automobile that has a motor for traveling and a power storage apparatus for exchanging electric power with the motor, comprising:
   an electronic control unit configured to execute external charging for charging the power storage apparatus by using electric power from an external power supply; and
   a navigation apparatus configured to perform a route guidance of a planned travel route to a destination,
   wherein, based on operation information on a charging spot of the destination not being obtainable, the navigation apparatus is configured to recommend executing external charging at a charging spot within a predetermined distance of the planned travel route,
   wherein, based on the operation information on the charging spot of the destination being obtainable and the navigation apparatus predicting that the charging spot of the destination is not available, the navigation apparatus is configured to recommend executing the external charging at a charging spot within the predetermined distance of the planned travel route, and
   wherein the operation information on the charging spot indicates a status of the charging spot.

2. The control apparatus for a vehicle according to claim 1, wherein, based on a prediction that the charging spot of the destination is not usable, as the recommendation for executing the external charging at the charging spot within the predetermined distance of the planned travel route, the navigation apparatus is configured to report that external charging at the charging spot of the destination is not executable, and report a charging spot which is capable of executing the external charging among charging spots within the predetermined distance of the planned travel route.

3. The control apparatus for a vehicle according to claim 1, wherein, based on the operation information on the charging spot of the destination not being obtainable, as the recommendation for executing the external charging at the charging spot within the predetermined distance of the planned travel route, the navigation apparatus is configured to report a charging spot within the predetermined distance of the planned travel route.

4. The control apparatus for a vehicle according to claim 2, wherein, based on a user instruction indicating that reporting the charging spot within the predetermined distance of the planned travel route is unnecessary, the electronic control unit is configured to limit an output of the power storage apparatus.

5. The control apparatus for a vehicle according to claim 1, wherein the navigation apparatus is configured to predict whether the charging spot of the destination is available at a planned arrival time of the destination.

6. The control apparatus for a vehicle according to claim 1, wherein, based on the vehicle arriving at a charging spot within the predetermined distance of the planned travel route, the navigation apparatus is configured to report a charging amount needed for reaching a nearest charging spot in a new trip after the vehicle has arrived at the destination.

7. An automobile comprising the control apparatus for a vehicle according to claim 1; the motor; and the power storage apparatus.

8. A control apparatus for a vehicle, which is mounted on an automobile that has a motor for traveling and a power storage apparatus for exchanging electric power with the motor, comprising:
   an electronic control unit configured to execute external charging for charging the power storage apparatus by using electric power from an external power supply; and
   a navigation apparatus configured to perform a route guidance of a planned travel route to a destination,
   wherein, based on operation information on a charging spot of the destination not being obtainable by the control apparatus, the navigation apparatus is configured to recommend executing the external charging at a charging spot that is within a predetermined distance of the planned travel route,
   wherein, based on the operating information on the charging spot of the destination being available, the navigation apparatus is configured to predict availability of the charging spot at a planned arrival time of the destination,
   wherein the operation information on the charging spot indicates a status of the charging spot.

9. The control apparatus for a vehicle according to claim 1, wherein the obtainability of operation information is based on whether the navigation apparatus is in communication with a server.

10. The control apparatus for a vehicle according to claim 8, wherein the obtainability of operation information is based on whether the navigation apparatus is in communication with a server.

11. The control apparatus for a vehicle according to claim 1, wherein the operation information on the charging spot comprises at least one of business hours of the charging spot or information on whether the charging spot has a failure.

12. The control apparatus for a vehicle according to claim 8, wherein the operation information on the charging spot comprises at least one of business hours of the charging spot or information on whether the charging spot has a failure.

\* \* \* \* \*